United States Patent [19]

Sekine

[11] Patent Number: 5,719,967
[45] Date of Patent: Feb. 17, 1998

[54] IMAGE PROCESSING APPARATUS

[75] Inventor: Hiroshi Sekine, Kanagawa, Japan

[73] Assignee: Fuji Xerox Co., Ltd., Tokyo, Japan

[21] Appl. No.: 499,389

[22] Filed: Jul. 6, 1995

[30] Foreign Application Priority Data

Jul. 7, 1994 [JP] Japan .................... 6-156146

[51] Int. Cl.$^6$ .................... H04N 1/40; H04N 1/46
[52] U.S. Cl. .................... 382/266; 382/269; 382/199; 382/205; 358/462; 358/532; 358/457
[58] Field of Search .................... 358/532, 462, 358/453, 450, 455, 466, 447, 540, 296, 298, 535, 457, 458, 467, 538; 395/109; 347/131; 382/266, 269, 199, 205

[56] References Cited

U.S. PATENT DOCUMENTS

| | | | |
|---|---|---|---|
| 4,437,122 | 3/1984 | Walsh et al. | 358/447 |
| 4,847,641 | 7/1989 | Tung | 347/131 |
| 4,992,955 | 2/1991 | Yabuuchi et al. | 358/465 |
| 5,029,108 | 7/1991 | Lung . | |
| 5,109,283 | 4/1992 | Carley | 358/298 |
| 5,257,116 | 10/1993 | Suzuki | 358/447 |
| 5,283,664 | 2/1994 | Fujisawa et al. | 358/429 |
| 5,363,210 | 11/1994 | Sasaki et al. | 382/266 |
| 5,453,848 | 9/1995 | Park et al. | 358/462 |
| 5,455,681 | 10/1995 | Ng | 358/462 |
| 5,467,196 | 11/1995 | Fukushima et al. | 358/462 |
| 5,491,564 | 2/1996 | Hongu | 358/462 |
| 5,521,721 | 5/1996 | Van Gennip | 358/462 |

FOREIGN PATENT DOCUMENTS 2-62260  3/1990  Japan .

Primary Examiner—Edward L. Coles, Sr.
Assistant Examiner—Fan Lee
Attorney, Agent, or Firm—Finnegan, Henderson, Farabow, Garrett & Dunner, L.L.P.

[57] ABSTRACT

An image processing apparatus capable of generating multivalue image data to be reproduced by a laser printer and the like as a hard copy having high visual quality. A first character/line drawing data is separated from an input multivalue image data to be subjected to an image data processing for removing jaggies appearing in curved or straight lines of characters and lines, and then is synthesized with a patter data having data indicative of edge directions to generate an output multivalue image data, so as to provide the hard copy having high visual quality.

8 Claims, 16 Drawing Sheets

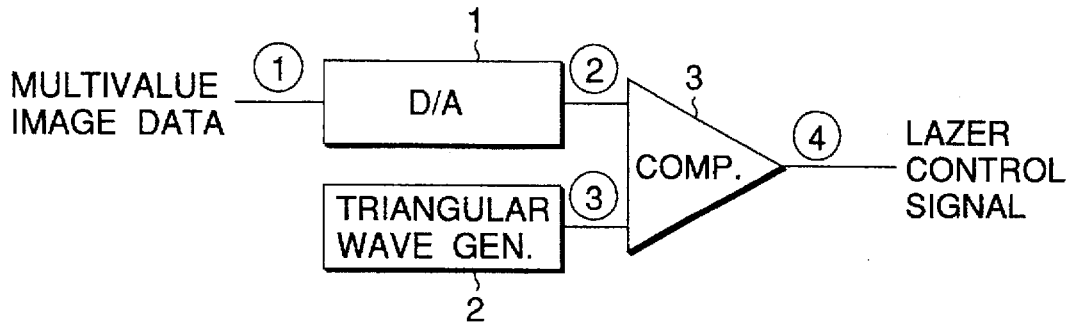
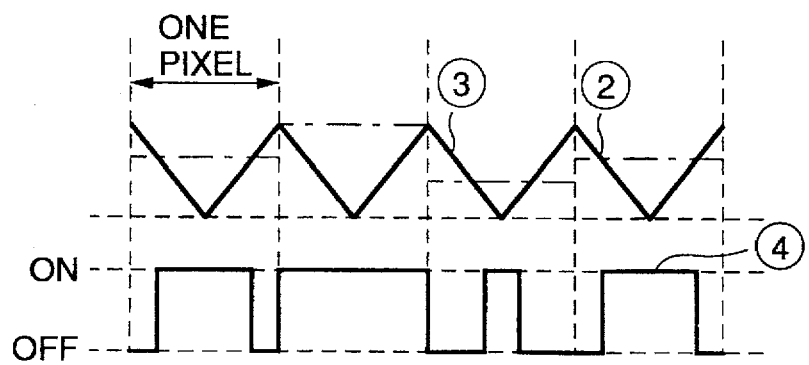
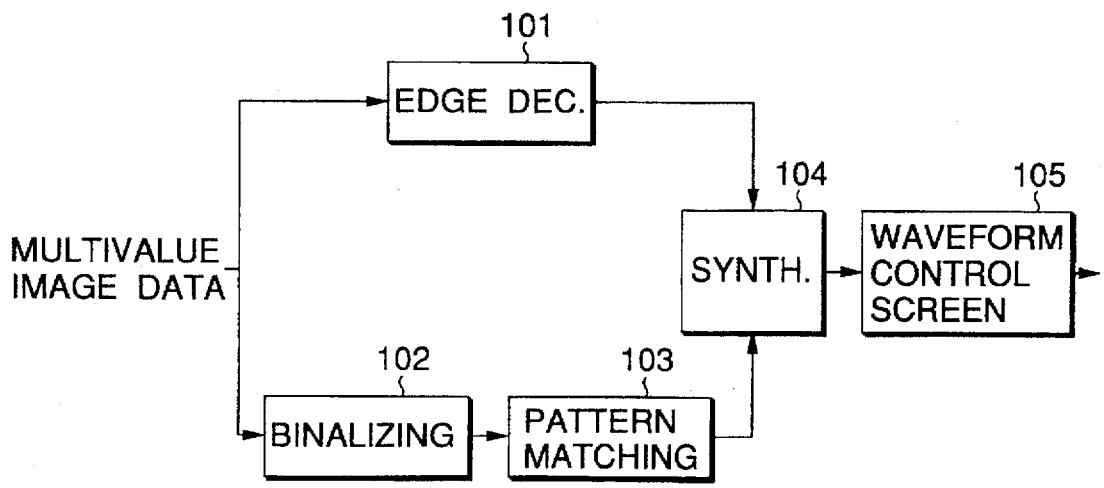

| 255 | 255 | 255 |
|---|---|---|
| 128 | 128 | 128 |
| 0 | 0 | 0 |

UPWARD EDGE

| 255 | 128 | 0 |
|---|---|---|
| 255 | 128 | 0 |
| 255 | 128 | 0 |

LEFTWARD EDGE

| EDGE DIRECTION FLAG(2bit) | EDGE DIRECTION |
|---|---|
| 00 | EDGELESS |
| 01 | UPWARD OR DOWNWARD |
| 10 | RIGHTWARD |
| 11 | LEFTWARD |

FIG.10
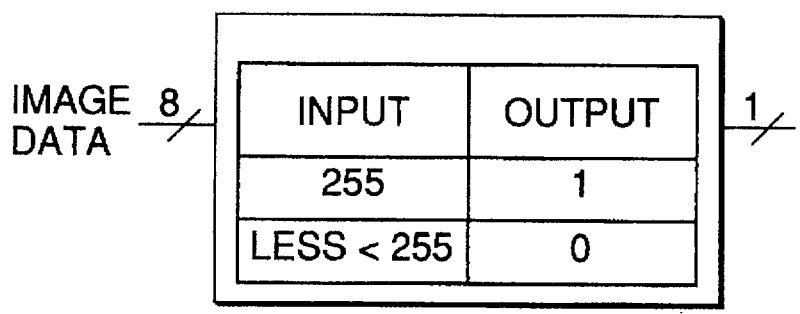
FIG.11
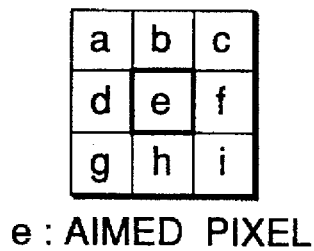
e : AIMED PIXEL
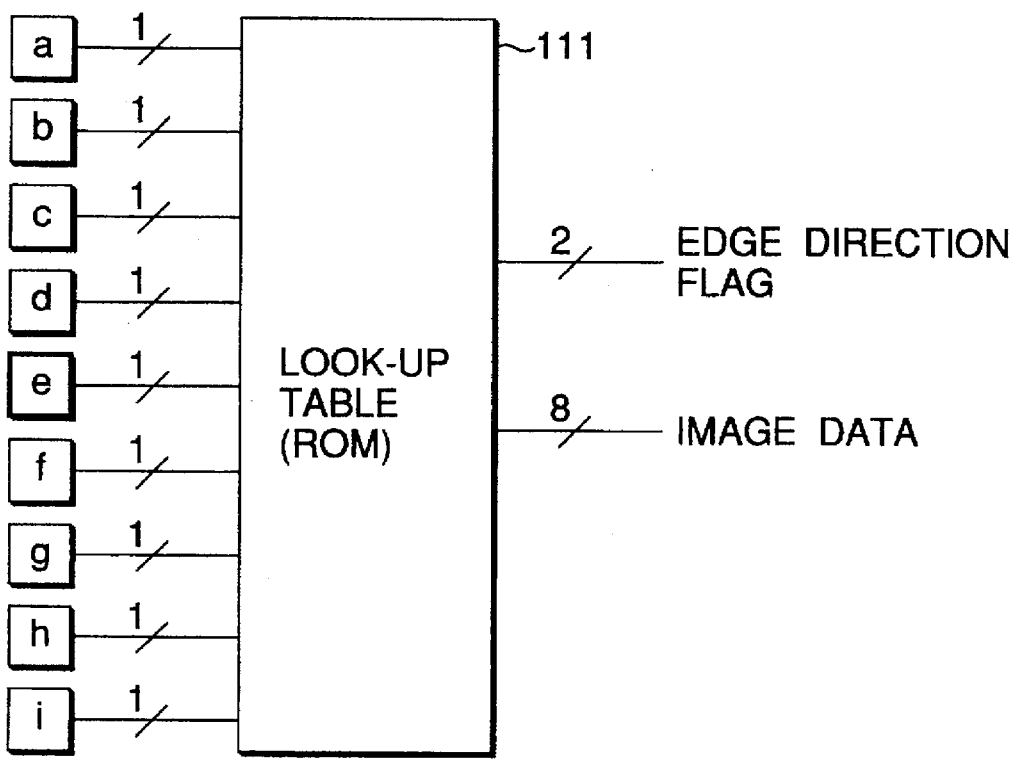

FIG.12

| INPUT PATTERN | IMAGE DATA | EDGE FLAG | INPUT PATTERN | IMAGE DATA | EDGE FLAG |
|---|---|---|---|---|---|
| 1 1 -<br>0 1 1<br>- 0 1 | 207 | R(10) | 1 0 -<br>1 1 0<br>- 1 1 | 207 | L(11) |
| 1 1 -<br>0 1 1<br>- 0 0 | 159 | R(10) | 0 0 -<br>1 1 0<br>- 1 1 | 159 | L(11) |
| 0 1 -<br>0 1 1<br>- 0 1 | 159 | R(10) | 1 0 -<br>1 1 0<br>- 1 0 | 159 | L(11) |
| - 1 1<br>1 1 0<br>1 0 - | 207 | L(11) | - 0 1<br>0 1 1<br>1 1 - | 207 | R(10) |
| - 1 0<br>1 1 0<br>1 0 - | 159 | L(11) | - 0 1<br>0 1 1<br>0 1 - | 159 | R(10) |
| - 1 1<br>1 1 0<br>0 0 - | 159 | L(11) | - 0 0<br>0 1 1<br>1 1 - | 159 | R(10) |

FIG.13

| INPUT PATTERN | IMAGE DATA | EDGE FLAG | INPUT PATTERN | IMAGE DATA | EDGE FLAG |
|---|---|---|---|---|---|
| 0 0 -<br>1 0 0<br>- 1 0 | 48 | L(11) | 0 1 -<br>0 0 1<br>- 0 0 | 48 | R(10) |
| 0 0 -<br>1 0 0<br>- 1 1 | 96 | L(11) | 1 1 -<br>0 0 1<br>- 0 0 | 96 | R(10) |
| 1 0 -<br>1 0 0<br>- 1 0 | 96 | L(11) | 0 1 -<br>0 0 1<br>- 0 1 | 96 | R(10) |
| - 0 0<br>0 0 1<br>0 1 - | 48 | R(10) | - 1 0<br>1 0 0<br>0 0 - | 48 | L(11) |
| - 0 1<br>0 0 1<br>0 1 - | 96 | R(10) | - 1 0<br>1 0 0<br>1 0 - | 96 | L(11) |
| - 0 0<br>0 0 1<br>1 1 - | 96 | R(10) | - 1 1<br>1 0 0<br>0 0 - | 96 | L(11) |

FIG.17

| EDGE DIRECTION FLAG (2BIT) | PIXEL POSITION | |
|---|---|---|
| | ODD PIXEL | EVEN PIXEL |
| 00 (EDGELESS) | TRIANGULAR WAVE A | TRIANGULAR WAVE A |
| 01 (U OR D) | TRIANGULAR WAVE C | TRIANGULAR WAVE C |
| 10 (R) | TRIANGULAR WAVE A | TRIANGULAR WAVE B |
| 11 (L) | TRIANGULAR WAVE B | TRIANGULAR WAVE A |

FIG.18

1st PIXEL → | 0 | 0 | 128 | 255 | 128 | 0 | 0 | ← 7th PIXEL  UPPER→IMAGE DATA (DECIMAL DATA)

| 00 | 10 | 10 | 00 | 11 | 11 | 00 |  LOWER→EDGE DIRECTION FLAG (BINARY DATA)

| A | B | A | A | B | A | A |  ←TRIANGULAR WAVE TO BE SELECTED

FIG.22
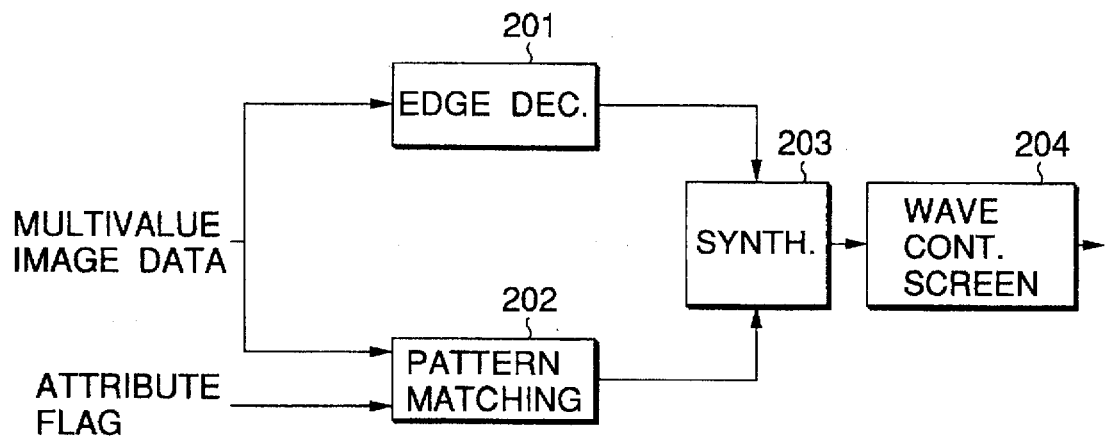
FIG.23
| ATTRIBUTE FLAG | MEANING |
|---|---|
| 0 | OTHER THAN CHARACTER / LINE |
| 1 | CHARACTER / LINE |
FIG.24
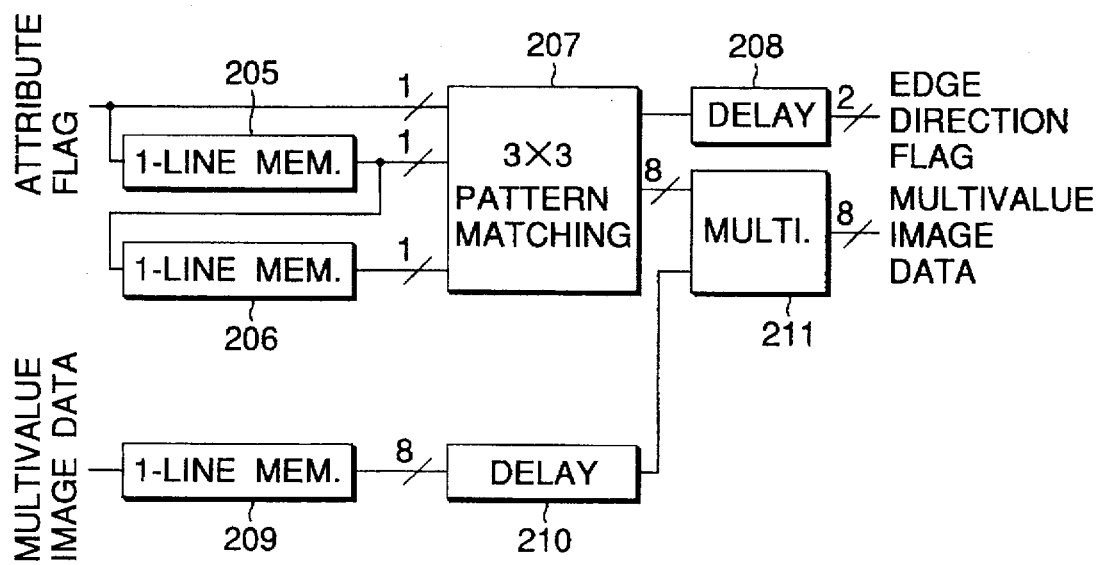

FIG.26

| INPUT PATTERN | MULTI. COEFFICIENT | EDGE FLAG | INPUT PATTERN | MULTI. COEFFICIENT | EDGE FLAG |
|---|---|---|---|---|---|
| `1 1 -`<br>`0 1 1`<br>`- 0 1` | 0.8125 | R(10) | `1 0 -`<br>`1 1 0`<br>`- 1 1` | 0.8125 | L(11) |
| `1 1 -`<br>`0 1 1`<br>`- 0 0` | 0.625 | R(10) | `0 0 -`<br>`1 1 0`<br>`- 1 1` | 0.625 | L(11) |
| `0 1 -`<br>`0 1 1`<br>`- 0 1` | 0.625 | R(10) | `1 0 -`<br>`1 1 0`<br>`- 1 0` | 0.625 | L(11) |
| `- 1 1`<br>`1 1 0`<br>`1 0 -` | 0.8125 | L(11) | `- 0 1`<br>`0 1 1`<br>`1 1 -` | 0.8125 | R(10) |
| `- 1 0`<br>`1 1 0`<br>`1 0 -` | 0.625 | L(11) | `- 0 1`<br>`0 1 1`<br>`0 1 -` | 0.625 | R(10) |
| `- 1 1`<br>`1 1 0`<br>`0 0 -` | 0.625 | L(11) | `- 0 0`<br>`0 1 1`<br>`1 1 -` | 0.625 | R(10) |

FIG.27

| INPUT PATTERN | MULTI. COEFFI-CIENT | EDGE FLAG | INPUT PATTERN | MULTI. COEFFI-CIENT | EDGE FLAG |
|---|---|---|---|---|---|
| 0 0 -<br>1 0 0<br>- 1 0 | 0.1875 | L(11) | 0 1 -<br>0 0 1<br>- 0 0 | 0.1875 | R(10) |
| 0 0 -<br>1 0 0<br>- 1 1 | 0.375 | L(11) | 1 1 -<br>0 0 1<br>- 0 0 | 0.375 | R(10) |
| 1 0 -<br>1 0 0<br>- 1 0 | 0.375 | L(11) | 0 1 -<br>0 0 1<br>- 0 1 | 0.375 | R(10) |
| - 0 0<br>0 0 1<br>0 1 - | 0.1875 | R(10) | - 1 0<br>1 0 0<br>0 0 - | 0.1875 | L(11) |
| - 0 1<br>0 0 1<br>0 1 - | 0.375 | R(10) | - 1 0<br>1 0 0<br>1 0 - | 0.375 | L(11) |
| - 0 0<br>0 0 1<br>1 1 - | 0.375 | R(10) | - 1 1<br>1 0 0<br>0 0 - | 0.375 | L(11) |

IIMAGE PROCESSING APPARATUS

BACKGROUND OF THE INVENTION

The invention relates to an image processing apparatus in which an input multivalue digital image (gray scale) data is subjected to an image processing to improve an image quality, and the processed data is then output through a laser beam printer or the like.

Laser beam printers using the xerography (electrophotography) technique are widely employed as a printer which outputs a bit map (binary digital image). In such printers, an input bit map image is subjected to an image processing so that jaggies (aliasing) appearing in curved or diagonal lines are reduced by improving resolution to a higher level than that of the input image, or changing the period of time in which a laser beam is turned on.

U.S. Pat. No. 4,437,122 discloses a method of improving resolution, in which an input bit map image is divided or segmented into blocks of 3×3 pixels, and a pattern matching is conducted so that the density of center pixels is converted into the nine-fold one, thereby reducing jaggies.

Published Unexamined Japanese Patent Application (Kokai) No. Hei-2-62260 discloses means for conducting logical arithmetic operation on 2 lines by 7 pixels, i.e., 14 pixels so that data of 600 dpi (dots/inch) are calculated from data of 300 dpi.

U.S. Pat. No. 4,847,641 discloses a system of controlling the on period of a laser beam, in which binary image data are segmented into blocks of 9×11 pixels to be matched to a plurality of predetermined standard patterns. In the case where the data coincide with at least one of the standard patterns, the on period of a laser beam for printing center bits are controlled so as to reduce jaggies.

Recently, a pulse width modulation (PWM) system is employed in a digital copying machine to reproduce a half-tone image with high image quality. In the PWM system, as shown in FIG. 1, a D/A converter 1 converts multivalue digital image data into an analog signal, and a comparator 3 compares the converted analog signal with a reference triangular-wave signal supplied from a triangular-wave generator 2 to controlling a laser beam.

FIG. 2 is a diagram showing waveforms at points [2], [3] and [4] of FIG. 1 in case of employing the xerography (electrophotography) technique of the image writing type in which laser emission is turned on during the period of adhering toners on a sheet. The comparator 3 compares the analog image signal with the reference triangular wave, so that the laser beam is turned on only when the image signal is higher in level than the triangular wave. In order to attain multifunction also serving as a printer and a facsimile machine, the digital copying machine is provided with an external interface in addition to the components for the copying function. A conventional laser printer merely reproduces a binary image, and therefore a half-tone portion is once converted into a pseudo half-tone portion by either an error diffusion method or a dither method and the converted data is then transmitted to the printer. In contrast, with a multifunction machine using a digital copying machine, multivalue data can be transmitted directly to a printing unit.

SUMMARY OF THE INVENTION

In the above-mentioned conventional system of reducing jaggies which appear in curved or diagonal lines, however, bit map (binary) image data are processed as an input data. Hence, these systems are not suitable for an image processing apparatus which processes multivalue digital image (gray scale) data. According to the data format of the multivalue digital image (gray scale) data, each of data which represents one pixel includes several bits indicative of density information. With the conventional system, jaggies are prevented from occurring in reproduced images by way of either subjecting the input bit map image data to pattern matching or logical arithmetic operation in order to improve image resolution, or controlling timing of turning on and off a lazer device.

Accordingly, it is an object of the present invention to provide an image processing apparatus capable of reducing jaggies which occur in not only a bit map image but also a multivalue digital image which is reproduced by subjecting input multivalue digital image (gray scale) data to image data processing.

The above, and other objects of the present invention is accomplished by the provision of an image processing apparatus comprising means for separating multivalue image data into first character/line drawing data, and first pattern data which are multivalue data other than the first character/line drawing data; means for subjecting the first character/line drawing data to an image processing of improving visual quality of reproduction image of character/ line to generate second character/line drawing data; means for detecting edge directions of pixels from the first pattern data to add data indicative of the edge directions to the first pattern data thereby generating second pattern data; and means for synthesizing the second character/line drawing data with the second pattern data to generate second multivalue image data.

With respect to image data written by a page description language, an attribute indicating whether the corresponding pixel is a character or line drawing or not can be known during the process of expanding the page description language into raster image data. Accordingly, the first character/ line drawing data may be selected from the multivalue image data in response to an input signal indicative of the attribute of pixels of the multivalue image signal, when the image data is of the page description language data.

BRIEF DESCRIPTION OF THE DRAWINGS

In the accompanying drawings:

FIG. 1 is a block diagram of a pulse width modulation type screen generator;

FIG. 2 is a diagram showing waveforms at points [2], [3] and [4] of the screen generator shown in FIG. 1;

FIG. 3 is a block diagram showing the whole of a first embodiment of the present invention;

FIG. 10 is a diagram illustrating a binarizing unit of the first embodiment;

FIG. 11 is a diagram illustrating a pattern matching unit of the first embodiment;

FIG. 12 is a diagram showing patterns used in pattern matching in the first embodiment;

FIG. 13 is also a diagram showing patterns used in pattern matching in the first embodiment;

FIG. 17 is an explanatory table showing the meaning of an edge direction flag;

FIG. 18 is a diagram illustrating a laser control signal according to the invention;

FIG. 22 is a block diagram showing the whole of a second embodiment;

FIG. 23 is a diagram illustrating an attribute flag in the second embodiment;

FIG. 24 is a block diagram of a pattern matching unit of the second embodiment;

FIG. 26 is a diagram showing patterns used in pattern matching in the second embodiment;

FIG. 27 is a diagram showing patterns used in pattern matching in the second embodiment;

DESCRIPTION OF THE PREFERRED EMBODIMENTS

Figure 4:
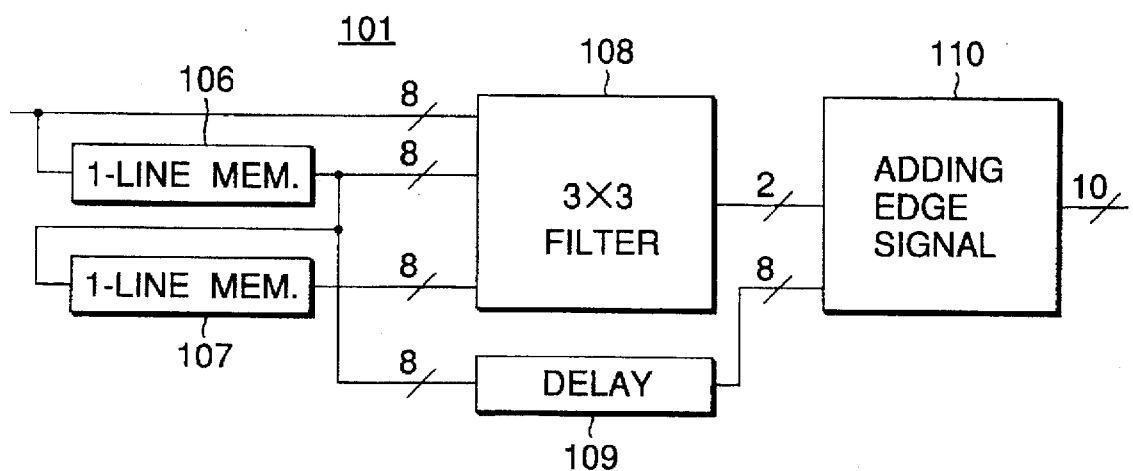
FIG. 4 is a block diagram of an edge detecting unit of the first embodiment.

Hereinafter, an image processing apparatus of the present invention such as a laser beam printer will be described in detail with reference to drawings.

First, data and signals used in the embodiment will be described. It is assumed that image data have gray scales of 8 bits and are quantized in such a manner that the density is increased with a larger value. Specifically, "0" indicates "white", and "255" indicates "black". In the following, description is made on multivalue black-and-white data. In the case of color image data, generally, data of one pixel are expressed by plural components such as "red (R), blue (B), and green (G)", "magenta (M), cyan (C), and yellow (Y)", "luminosity (L*), hue (H*), and chroma (C*)", or "L* a* b*". In such a case, the embodiment described below are applied to each of the components.=

FIG. 3 is a block diagram showing a first embodiment of an image processing apparatus according to the present invention. Input image data are supplied to an edge detecting unit 101 and also to a binarizing unit 102. The multivalue data are binarized by the binarizing unit 102 and then supplied to a pattern matching unit 103. The edge detecting unit 101 detects an edge and its direction from the input multivalue image data, adds an edge direction flag to the image data, and outputs the resulting image data. The pattern matching unit 103 conducts "binary to multivalue conversion" by which jaggies of binarized data are reduced, and generates a flag indicative of the direction of an edge. A synthesizing unit 104 synthesizes the output of the edge detecting unit 101 with that of the pattern matching unit 103, and supplies the resulting image data and the edge direction flag to a waveform control screen unit 105. The waveform control screen unit 105 generates an "on/off" signal for a laser beam, from the input image data and edge direction flag.

Figure 5:
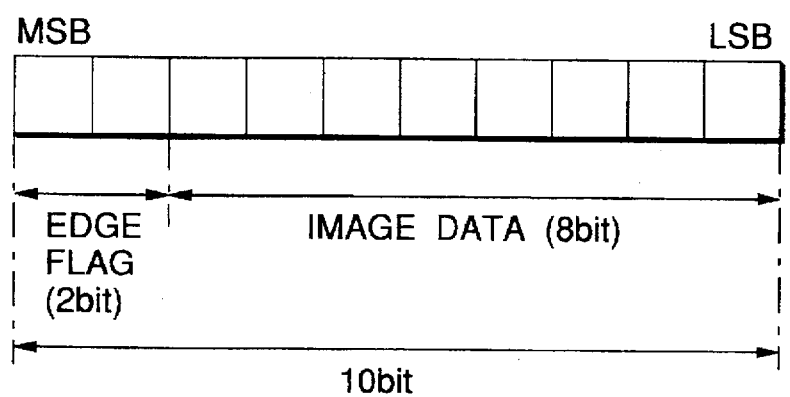
FIG. 5 is an explanatory diagram illustrating the data format of multivalue image data and an edge direction flag.

FIG. 4 shows the internal configuration of the edge detecting unit 101. Each of 1-line memories 106 and 107 is a memory which can store one line of image data, and conducts a blocking process for performing the spatial filtering process on input image data. A 3×3 filtering unit 108 conducts the filtering process on the blocked image data, detects of an edge direction of the image data, and outputs an edge direction flag of 2 bits. A delaying unit 109 synchronizes the input image data with the edge direction flag output from the 3×3 filtering unit 108. An edge signal adding unit 110 synthesizes an 8-bit image signal output from the delaying unit 109 with the 2-bit edge direction flag output from the 3×3 filtering unit 108, and outputs the synthesized 10-bit signal. In the output signal of the edge signal adding unit 110, as shown in FIG. 5, significant 2 bits of the 10 bits constitute a flag indicative of an edge direction, and least 8 bits thereof are image data.

Figure 6:
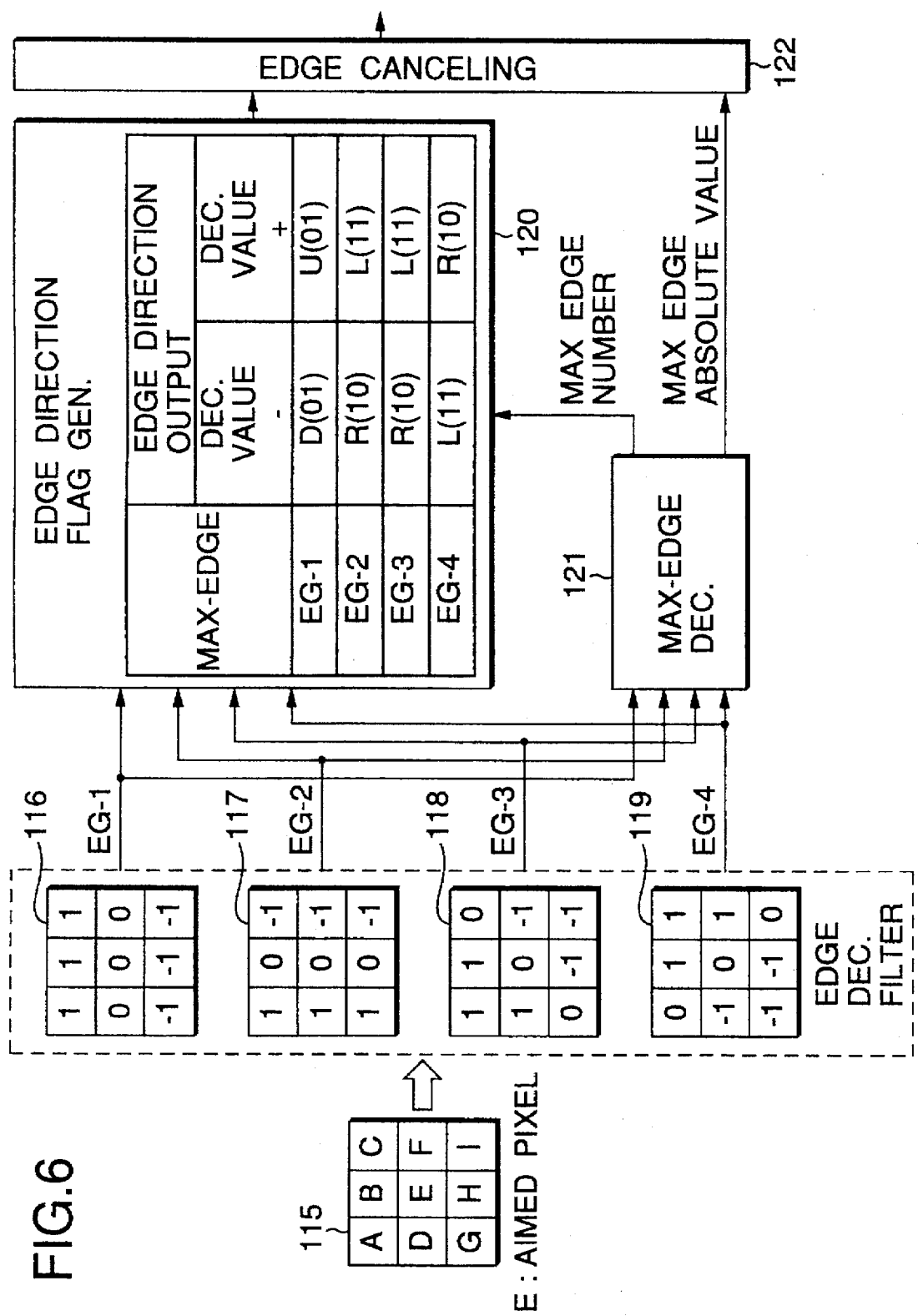
FIG. 6 is a block diagram showing the edge detecting unit of the first embodiment.
Figures 7A, 7B, 8, 9:
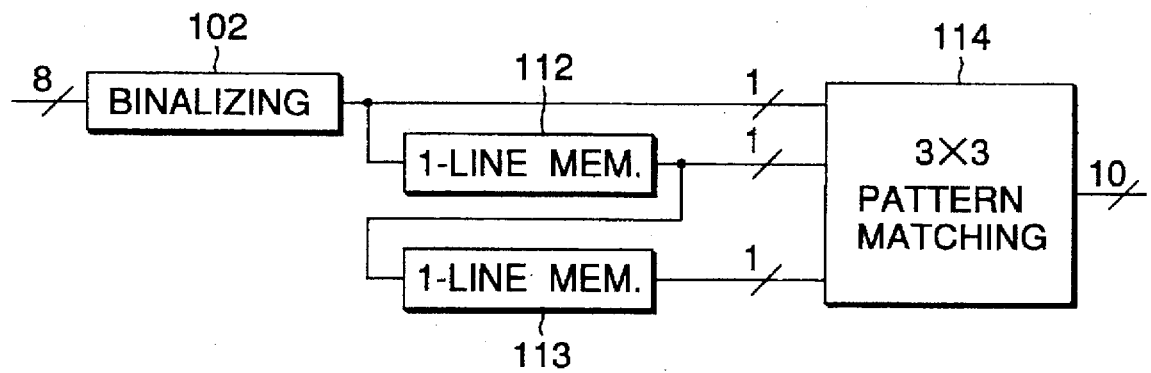
FIGS. 7A and 7B are explanatory diagrams for the direction of an edge.
FIG. 8 is an explanatory table showing the meaning of an edge direction flag.
FIG. 9 is a block diagram of a pattern matching unit of the first embodiment.

Next, the 3×3 filtering unit 108 will be described in more detail with reference to FIG. 6. The input image data are segmented into blocks of 3×3 pixels with setting a pixel to be enhanced at the center. A blocked image 115 is subjected to convolutions with using four kinds of coefficients 116, 117, 118 and 119. The results of the convolutions are set to be four kinds of edge signals EG-1, EG-2, EG-3 and EG-4, respectively. In a maximum-edge detecting, unit 121, the absolute values of the four edge signals EG-1, EG-2, EG-3 and EG-4 is obtained. The maximum one of the four absolute values is supplied to an edge canceling unit 122, and the number (one of 1 to 4) of the edge signal having the maximum absolute value is supplied to an edge-direction flag generating unit 120. Supplied to the edge-direction flag generating unit 120 are the four edge signals EG-1, EG-2, EG-3 and EG-4, and the maximum-edge number output from the maximum-edge detecting unit 121. In accordance with the maximum-edge number, one of the four edge signals EG-1, EG-2, EG-3 and EG-4 is selected, and the edge direction is determined depending on the sign (positive or negative) of the selected edge signal to form the 2-bit edge-direction flag. When the maximum-edge number is "2" and the value of the edge signal EG-2 is "positive", for example, the edge direction of a pixel to be enhanced is "left". In the case where the density is decreased in the direction directed from the upper portion to the lower portion as shown in FIG. 7A is called as "upward edge", and in the case where the density is decreased in the direction directed from the left portion to the right portion as shown in FIG. 7B is called "leftward edge". As shown in FIG. 8, "00" of the 2-bit edge direction flag indicates edgeless, "01" indicates an upward or downward edge, "10" indicates a rightward edge, and "11" indicates a leftward edge.

As described above, in the edge-direction flag generating unit 120, the edge direction flag having one of "01", "10" and "11" is generated for each of the all pixels. When the maximum-edge absolute value output from the maximum-edge detecting unit 121 is not greater than a fixed certain value, the edge canceling unit 122 resets the edge direction flag to "00".

FIG. 9 is a block diagram illustrating the internal configuration of the pattern matching unit 103. As shown in FIG. 10, the binarizing unit 102 outputs "1" when the input image data is "255", and "0" when the input image data is "less than 255". The 1-bit signal generated by the binarizing unit 102 is blocked by using 1-line memories 112 and 113, and then supplied to a 3×3 pattern matching unit 114.

FIG. 11 is a diagram illustrating in more detail the 3×3 pattern matching unit 114. Data of 9 pixels which have been segmented into a 3×3 block by using 1-line memories 112 and 113 with setting a pixel to be enhanced at the center are coupled to addresses of a ROM 111 for a look-up table, respectively. The look-up table 111 is set so that, in the case of a pattern other than patterns shown in FIGS. 12 and 13, the image data "0" and the edge direction flag "00" are output when the value of the pixel to be enhanced "e" is "0", and the image data "255" and the edge direction flag "00" are output when the value of the pixel to be enhanced "e" is "1". In the case of the patterns shown in FIGS. 12 and 13, the image data and the edge direction flag shown in the tables are output, or output as the 10-bit data having the format shown in FIG. 5.

In the pattern matching unit 103, the continuity of the density of "255" in the multivalue image data attains the effect that, when pixels of the density of "255" are continuous in a diagonal direction, jaggies in that portion are reduced.

Figure 14:
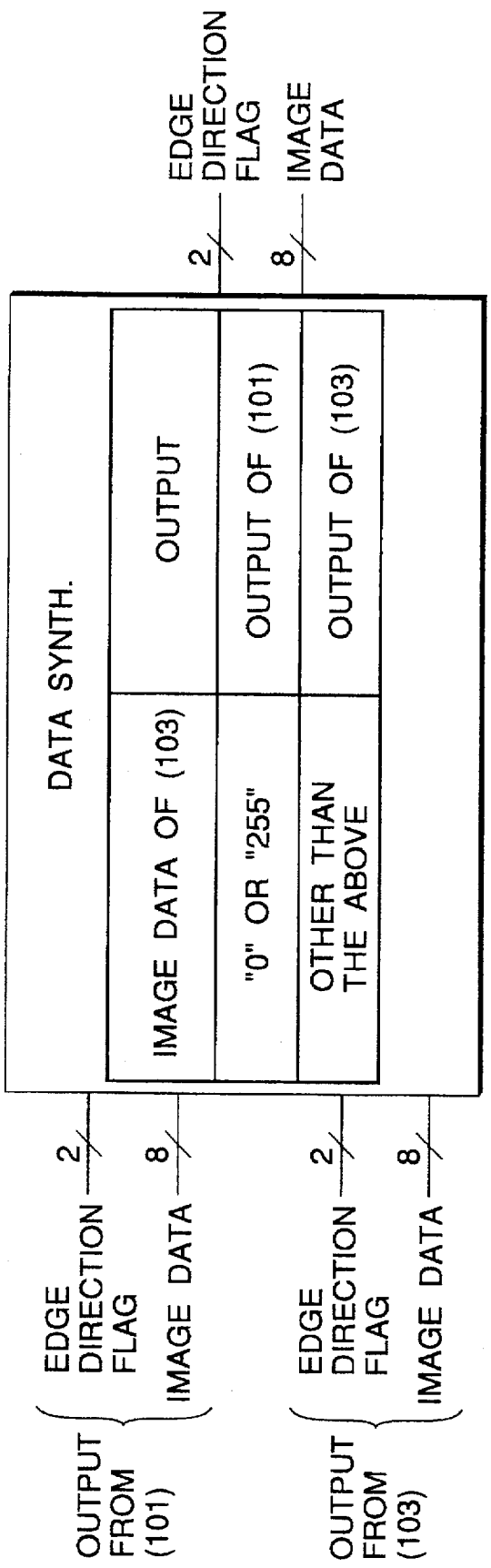
FIG. 14 is a diagram illustrating a synthesizing unit of the first embodiment.

FIG. 14 shows the internal configuration of the synthesizing unit 104. The synthesizing unit 104 is a unit which synthesizes the outputs of the edge detecting unit 101 and the pattern matching unit 103 with each other. The synthesis is conducted in the following logic. The image data of the pattern matching unit 103 are checked. When the image data supplied from the pattern matching unit 103 to the synthesizing unit 104 have a value of "0" or "255", the image data and the edge direction flag which are supplied from the edge detecting unit 101 are set to be the output of the synthesizing unit 104. When the image data supplied from the pattern matching unit 103 to the synthesizing unit 104 have a value which is neither "0" nor "255", the image data and the edge direction flag which are supplied from the pattern matching unit 103 are set to be the output of the synthesizing unit 104. As seen from the above, when the pattern matching unit 103 outputs data other than "0" and "255" or when pixels of the density of "255" in multivalue image data are continuous in a diagonal direction, the synthesizing unit 104 preferentially outputs pixel values which are generated in order to reduce jaggies in a diagonal direction.

Figure 15:
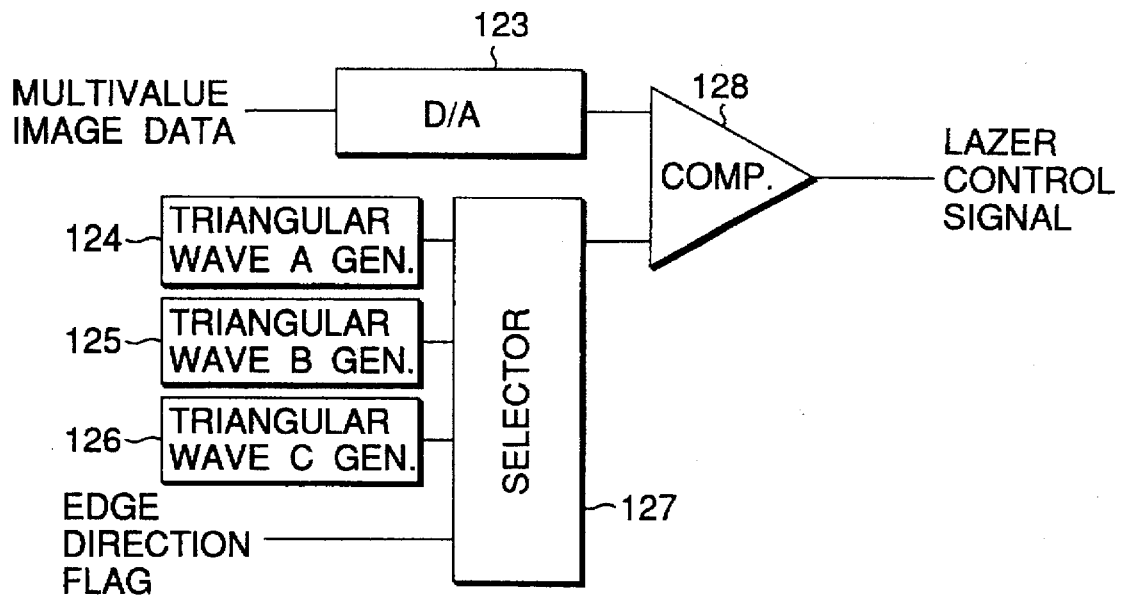
FIG. 15 is a block diagram of a waveform control screen generator.

In the waveform control screen unit 105, as shown in FIG. 15, the 8-bit multivalue image data supplied from the synthesizing unit 104 are converted into an analog value through a D/A converter 123, so as to be compared in a comparator 128 with a triangular wave which is selected by a selector 127 in accordance with the edge direction flag, thereby generating a laser control signal.

Figure 16:
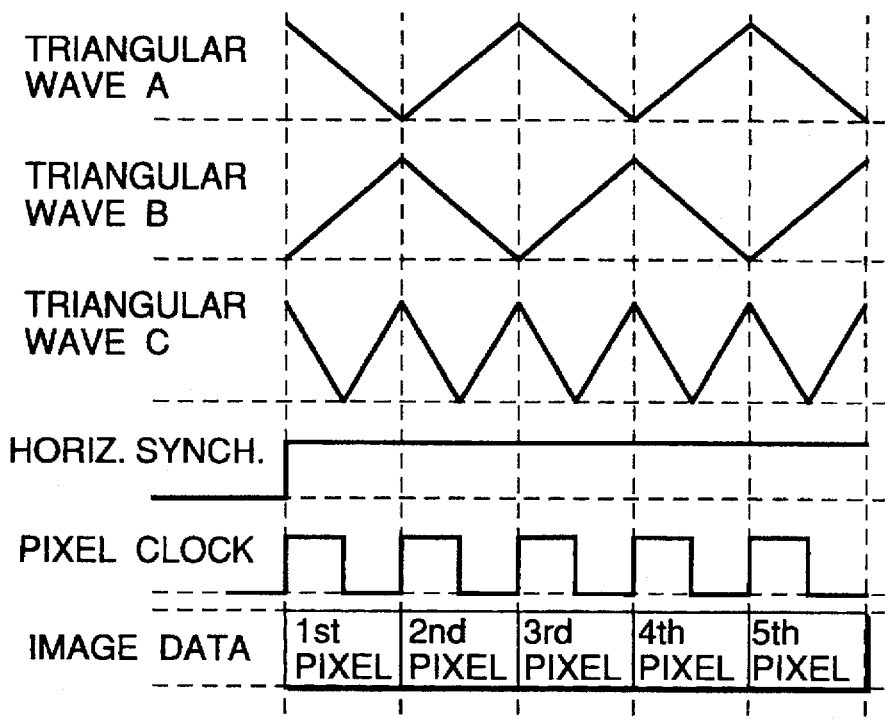
FIG. 16 is a diagram illustrating triangular waves generated by the waveform control screen generator.

As shown in FIG. 16, the triangular waves selected by the selector 127 are triangular waves A and B which have a period two times as much as that of the pixel clock signal and are shifted in phase from each other by 180 deg., and a triangular wave C which has the same period as that of the pixel clock signal.

Figure 19:
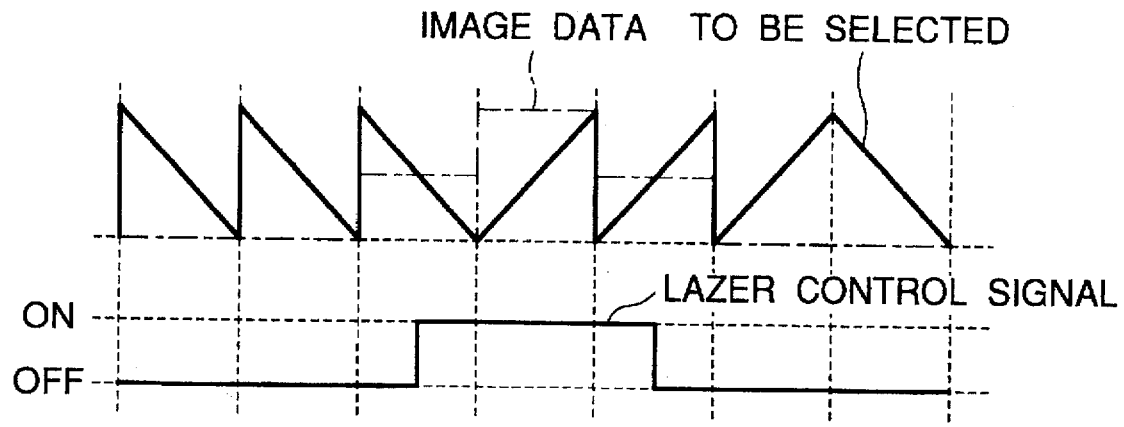
FIG. 19 is a diagram illustrating a laser control signal according to the invention.
Figure 20:
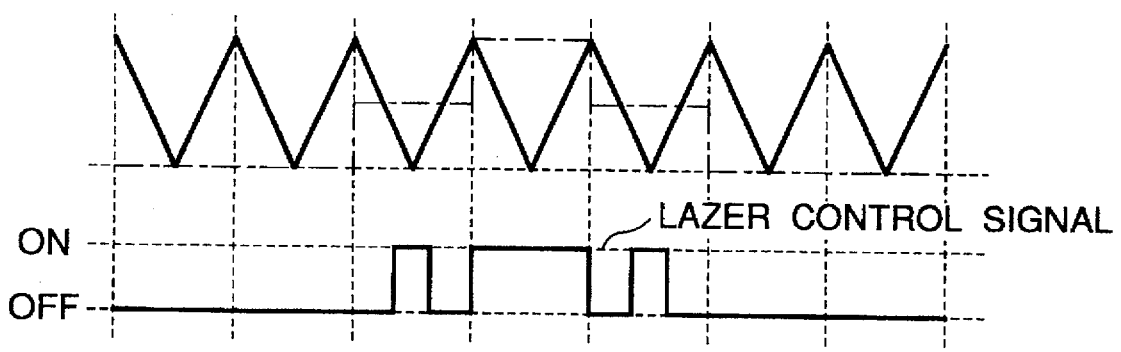
FIG. 20 is a diagram illustrating a laser control signal according to the invention.
Figures 21A, 21B:
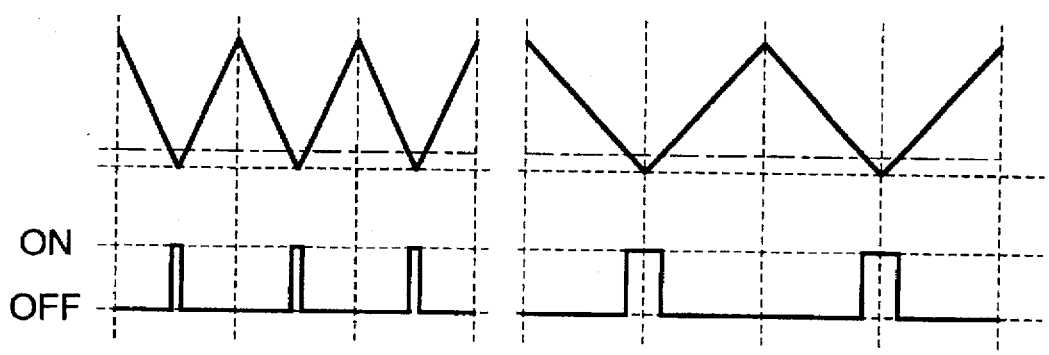
FIG. 21 is a diagram illustrating a laser control signal according to the invention.

FIG. 17 shows relationships between the edge direction flag and selected triangular waves. When image data and edge direction flags such as those shown in FIG. 18 are supplied to the waveform control screen unit, the triangular waves shown in the lowest row in FIG. 18 are selected. FIG. 19 diagrammatically shows the laser control signal which is generated from the thus selected triangular waves. The laser printer of the embodiment is a so-called image writing type printer in which toner is attracted to areas of a photoconductor that are irradiated by a laser beam and the areas are output as a black image formed on a sheet. FIG. 20 shows the case where the image data shown in FIG. 18 are not subjected to the waveform control and the laser control signal is generated by using the triangular wave C which has the same period as that of the pixel clock signal. When the waveforms shown in FIGS. 19 and 20 are compared with each other, the followings will be seen. In FIG. 19 where the wave control is conducted, the laser control signal exists at the center portion in more concentrated manner whereas in FIG. 20, the laser beam-on signal is divided into three parts resulting degrading the quality of an image. In other words, a cleaner electronic latent image is formed on the photoconductor in the case of FIG. 19. As shown in FIG. 17, the triangular wave C which has the same period as that of the pixel clock signal is selected only when the edge direction flag indicative of the upward or downward edge direction is input in synchronization with the image signal. In the usual case of edgeless or when the edge direction flag is "00", the triangular wave A which has a period two times as much as that of the pixel clock signal is selected. This means that, for example, a printer which can perform the printing of a pixel density of 400 dpi (dots/inch) produces an output image by using a line screen of 200 lpi (lines/inch). The reason of the above is as follows: The cases where the laser control signal is generated by using a triangular wave which has the same period as that of the pixel clock signal (see a part (a) of FIG. 21), and where the laser control signal is generated by using a triangular wave which has a period two times as much as that of the pixel clock signal (see a part (b) of FIG. 21) are considered. When a highlight portion having a low density is to be output, particularly, the laser beam-on period in the former case is much shorter than that in the latter case as shown in FIG. 21. When the laser beam illumination period is very short as described above, it may be difficult to form an electronic latent image on a photoconductor stably. Consequently, it is difficult to output the gray scale of image data faithfully.

In the above, the system of reducing jaggies when pixels of the density of "255" appear continuously in a diagonal direction of a multivalue original has been described. When character data are to be inserted into usual multivalue image data (for example, a photograph), in most cases, the character data are written at the maximum density. Therefore, the present system as described above is very effective in improving the image quality of a character/line drawing in multivalue image data.

A second embodiment of the invention will be described. A multivalue image data may be subjected to a processing of separating characters from patterns in advance. Thereafter, the image data and an attribute signal of each pixel are simultaneously supplied to an image processing apparatus. Further, when image data written by a page description language (PDL) are to be output, the attribute (character, line drawing, pattern, etc.) of each pixel can be detected during the process of expanding the page description language into raster image data. Accordingly, both the image data and an attribute signal of each pixel may be supplied to an image processing apparatus at once. The second embodiment is effective in the case where both image data and a 1-bit attribute flag indicating that the corresponding pixel is "a character or line drawing" are simultaneously input.

FIG. 22 is a block diagram showing the second embodiment of the invention. Input image data are supplied to an edge detecting unit 201 and a pattern matching unit 202, respectively. An attribute flag which is input at the same time with the image data is supplied to the pattern matching unit 202. The edge detecting unit 201 detects an edge and its direction from the input multivalue image data, and then adds an edge direction flag to the image data to be output. The pattern matching unit reduces jaggies of an edge of "a character or line drawing" of the image data, and further generates a flag indicative of the direction of the edge. A synthesizing unit 203 synthesizes the output of the edge detecting unit 201 with that of the pattern matching unit 202, and supplies the resulting image data and the edge direction flag to a waveform control screen unit 204. The waveform control screen unit 204 generates an "on/off" signal for a laser beam, in accordance with the input image data and edge direction flag. The edge detecting unit 201 and the waveform control screen unit 204 are identical to the edge detecting unit 101 and the waveform control screen unit 105 of the first embodiment, and therefore their description is omitted.

FIG. 23 is an explanatory table showing the meaning of the attribute flag which is supplied at the same time with image data to the image processing apparatus. A 1-bit flag as shown in FIG. 23 is added to all pixels of input multivalue image data. A pixel to which an attribute flag "0" is added is a pixel other than "a character or line drawing", and a pixel to which an attribute flag "1" is added is "a character or line drawing".

FIG. 24 is a diagram illustrating the internal configuration of the pattern matching unit 202. The input 1-bit attribute flag signal is subjected to the blocking process into blocks by using 1-line memories 205 and 206, and then supplied to a 3×3 pattern matching unit 207. The multivalue image data are delayed by a period for one line by a 1-line memory 209. A delaying unit 210 synchronizes the input image data with the data output from the 3×3 matching unit 207. The 3×3 pattern matching unit 207 outputs a multiplication coefficient which will be multiplied by the multivalue image data in a multiplying unit 211. The 3×3 matching unit 207 outputs also a 2-bit edge direction flag in synchronization with the multiplication coefficient. A delaying unit 208 synchronizes the edge direction flag with the output of the multiplying unit 211.

Figure 25:
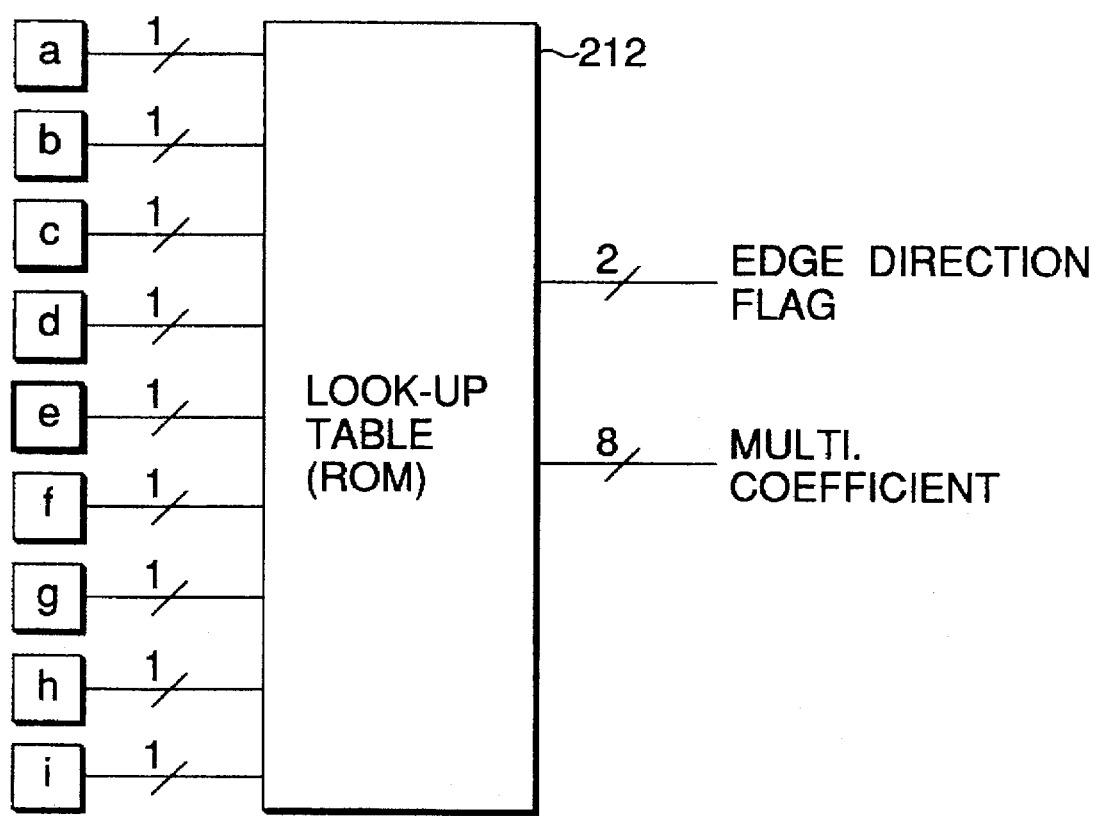
FIG. 25 is a block diagram of the pattern matching unit of the second embodiment.
Figure 28:
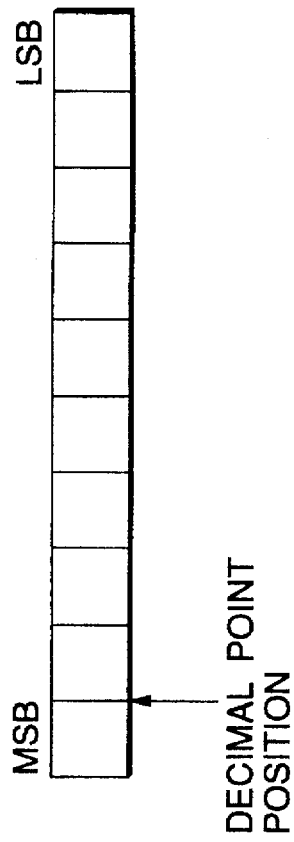
FIG. 28 is a diagram illustrating a multiplication coefficient used in the second embodiment.

FIG. 25 is a diagram illustrating in more detail the 3×3 pattern matching unit 207. Data of 9 pixels which have been segmented into a 3×3 block by using 1-line memories 205 and 206 with setting an pixel to be enhanced at the center are coupled to addresses of a ROM 212 for a look-up table, respectively. The look-up table 212 is set so that, in the case of a pattern other than patterns shown in FIGS. 26 and 27, the multiplication coefficient "0" and the edge direction flag "00" are output when the value of the interested pixel "e" is "0", and the multiplication coefficient "1" and the edge direction flag "00" are output when the value of the interested pixel "e" is "1". In the case of the patterns shown in FIGS. 26 and 27, the multiplication coefficient and the edge direction flag shown in the tables are output. The multiplication coefficient consists of 8-bit data having the integer part of 1 bit and the fraction part of 7 bits. The edge direction flag consists of 2-bit data as shown in FIG. 8 in the same manner as the first embodiment. The multiplication coefficient output from the look-up table 212 is multiplied in the multiplying unit 211 by the multivalue image data output from the delaying unit 210, and then sent to the synthesizing unit 203.

Figure 29:
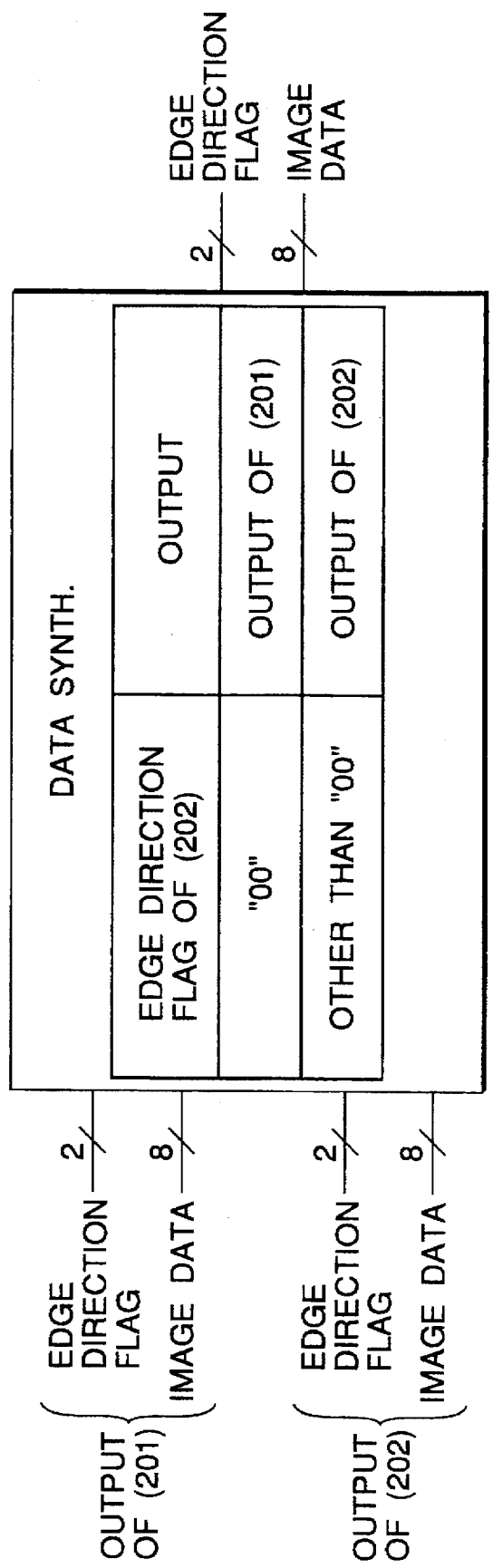
FIG. 29 is a diagram illustrating a synthesizing unit of the second embodiment.

FIG. 29 shows the internal configuration of the synthesizing unit 203. The synthesizing unit 203 is a unit which synthesizes the outputs of the edge detecting unit 201 and the pattern matching unit 202 with each other. The synthesis is conducted in the following logic. The edge direction flag of the pattern matching unit 202 is checked. When the edge direction flag supplied from the pattern matching unit 202 to the synthesizing unit 203 is "00", the image data and the edge direction flag which are supplied from the edge detecting unit 201 are set to be the output of the synthesizing unit 203. When the edge direction flag supplied from the pattern matching unit 202 to the synthesizing unit 203 has a value which is not "00", the image data and the edge direction flag which are supplied from the pattern matching unit 202 are set to be the output of the synthesizing unit 203. As seen from the above, the pattern matching unit 202 detects the continuity of the edge direction flag indicative of a "character" or "line drawing" by means of pattern matching, and the synthesizing unit 203 preferentially outputs pixel values which are generated in order to reduce jaggies in a diagonal direction.

In the two embodiments described above, the blocks used in the edge detection and pattern matching have a size of 3×3 in order to illustrate the spirit of the invention. The size is not restricted to this value, and larger blocks may be employed. Further, in the above description, the pattern matching unit uses a ROM as the look-up table. Alternatively, a RAM, or logic circuits such as AND and OR circuits may be replaced therefor.

As described in the two embodiments, multivalue image data input to the image processing apparatus are divided into character/line drawing data, and other data, and an image processing of removing jaggies appearing in curved or diagonal lines is conducted on the divided character/line drawing data, whereby jaggies in curved or diagonal lines can be reduced in a multivalue image.

What is claimed is:

1. An image processing apparatus comprising:
   means for receiving multivalue image data as first character/line drawing data and first pattern data;
   means for subjecting said first character/line drawing data to image processing operations that generate second character/line drawing data with improved visual reproduction quality;
   means for detecting edge directions of pixels from said first pattern data and adding data indicative of the edge directions to said first pattern data, thereby generating second pattern data; and
   means for synthesizing said second character/line drawing data with said second pattern data to generate second multivalue image data.

2. An image processing apparatus as defined in claim 1 wherein said multivalue image data is converted to digital data which is then subjected to the image processing to generate said multivalue image data, thereby generating said second character/line drawing data.

3. An image processing apparatus as defined in claim 2 wherein the image processing of improving visual quality of reproduction image is carried out to remove jaggies appearing in curved or straight lines of character/line drawing.

4. An image processing apparatus as defined in claim 1 wherein said first character/line drawing data has density level higher than a predetermined threshold level.

5. An image processing apparatus as defined in claim 1 wherein said first character/line drawing data is selected from said multivalue image data in response to an input signal indicative of attributes of pixels of said multivalue image signal.

6. An image processing apparatus for removing jaggies appearing in multivalue image data, comprising:

edge detection means for receiving the multivalue image data and for detecting an edge and a direction of the edge in the multivalue image data;

pattern matching means including means for storing a predetermined set of image patterns, each said image pattern associated with a multiplication factor and a direction of an edge in the image pattern, the pattern matching means receiving the multivalue image data and attribute information describing the multivalue image data and multiplying the multivalue image data by the multiplication factor associated with the image pattern of the set of image patterns that matches the attribute information; and synthesizing means receiving a first information set including the multivalue image data and an indication of the direction of the edge from the edge detection means and receiving a second information set including the multiplied multivalue image data and an indication of the direction of an edge in the image pattern associated with the attribute information, the synthesizing means selecting the first information set or the second information set based on the indication of the direction of an edge received from the pattern matching means.

7. An image processing apparatus for removing jaggies in multivalue image data, comprising:

edge detection means for receiving the multivalue image data and for detecting an edge and a direction of the edge in the multivalue image data and for outputting the multivalue image data as first multivalue image data, and the direction of the edge of the multivalue image data, as first edge direction data;

binarizing means for receiving the multivalue image data and transforming the multivalue image data to binary image data;

pattern matching means for receiving the binary image data and storing a predetermined set of image patterns, the pattern matching means further including means for comparing the stored set of image patterns to the received binary data and, based on the comparison, outputting second multivalue image data and second edge direction data; and synthesizing means for receiving the first and second multivalue image data and the first and second edge direction data and selecting the second multivalue image data and the second edge direction data or the first multivalue image data and the first edge direction data based on the value of the second multivalue image data.

8. The image processing apparatus of claim 7, wherein the synthesizing means selects the second multivalue image data and the second edge direction data when the second multivalue image data has a value other than "255" or "0" and the synthesizing means selects the first multivalue image data and the first edge direction data when the second multivalue image data has a value of either "255" or "0."

* * * * *